Nov. 24, 1925.
K. L. E. THUNHOLM
1,562,525
APPARATUS FOR EVAPORATING LIQUIDS INDIRECTLY
Filed March 9, 1921
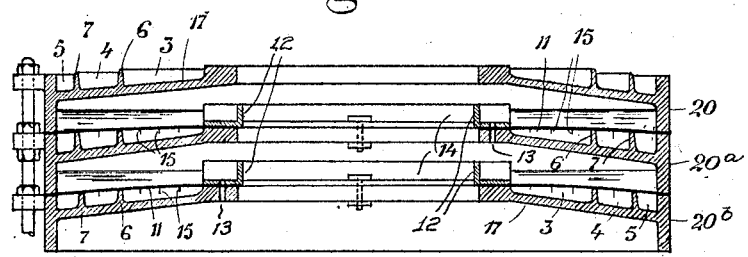
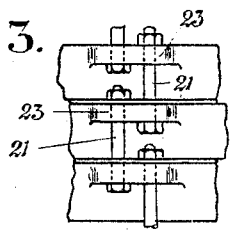
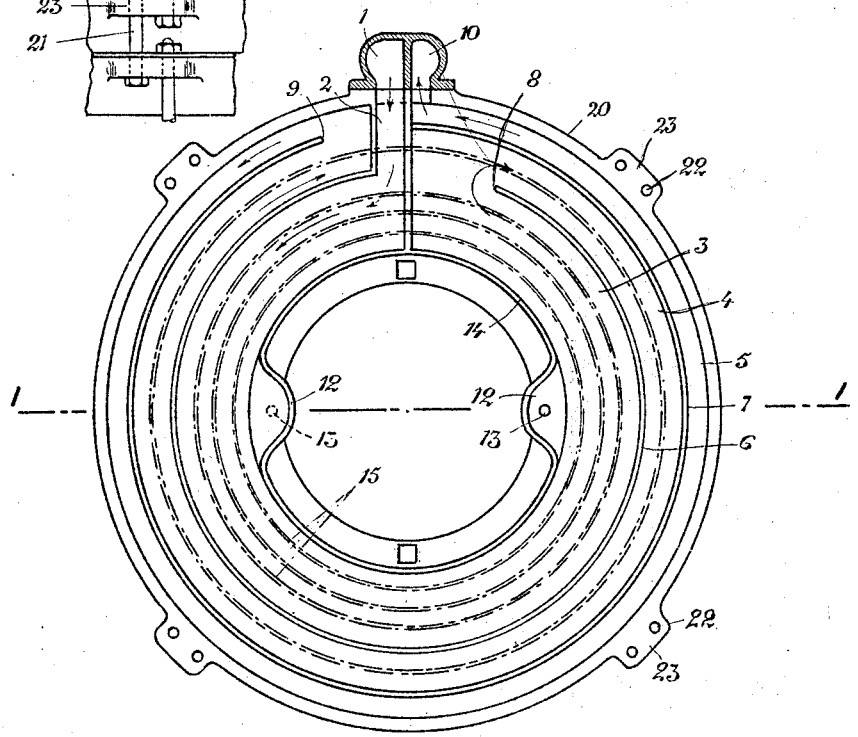
Inventor
K. L. E. Thunholm,
By Marks & Clerk
Attys.

Patented Nov. 24, 1925.

1,562,525

UNITED STATES PATENT OFFICE.

KARL LARS ESAIAS THUNHOLM, OF OREBRO, SWEDEN.

APPARATUS FOR EVAPORATING LIQUIDS INDIRECTLY.

Application filed March 9, 1921. Serial No. 450,929.

*To all whom it may concern:*

Be it known that I, KARL LARS ESAIAS THUNHOLM, a subject of the King of Sweden, residing at Vastragatan 21, Orebro, in the Kingdom of Sweden, have invented certain new and useful Improvements in Apparatus for Evaporating Liquids Indirectly, of which the following is a specification.

This invention relates to apparatus for evaporating liquids indirectly of that type, in which the liquid during the evaporating operation is spread on a surface and is heated by the transmission of heat indirectly from a heating medium, for instance saturated water steam, acting on the opposite side of the said surface. In apparatus of the said type it is of importance that the heat transmitting surface is thin and of a material of great heat conducting capacity, which is able to resist the corroding action, if any, of the liquid. Apparatus, hitherto used, have been objectionable in many respects for the reason, that the heat transmitting surfaces have not been so arranged, that they are able in course of time to resist the pressure in the steam channels and consequently are easily deformed. A further drawback of the said apparatus consists in the water of condensation being deposited on the heat transmitting surfaces. Experience, however, has proved, that even the thinnest coat of water on the heat transmitting surface, for instance a thickness of only 0.1 millimetre, is able to reduce the total amount of transmitted heat to one half of the heat, which is transmitted, if the surface is perfectly free from water.

The object of this invention is to improve the said apparatus in such manner, that the said inconveniences are removed. For that purpose the ring-shaped heat transmitting members, which preferably are made of cast iron, are provided with a number of concentric channels for the steam, which channels have a removable, comparatively thin top wall which constitutes the proper heat transmitting surface. The said top wall is made of a material of great heat conducting capacity and having great resistance against the liquid, which is evaporated. The heat transmitting members are so shaped, that the heat transmitting surface is slightly concavo-convex, i. e. it forms a part of a sphere with a long radius and thus has a certain initial tension, so that it is able, without altering its shape, to resist the pressure existing in the steam channel. The depositing of water of condensation on the heat transmitting surface is prevented by the providing of a number of ring-shaped, concentric steam channels, the cross sectional area of which is successively reduced from the channel, into which the steam is introduced, to the channel, from which the steam escapes, which consequently has the smallest cross sectional area. This results in the velocity of the steam being, practically, the same in all channels. Each channel may be of uniform breadth along its whole length or successively contract from its inlet toward its outlet ends. The channel having the greatest cross sectional area, in which channel the steam is first introduced, is preferably located nearest to the centre.

The water of condensation deposited on the heat transmitting surface is then forced by the centrifugal force away toward the vertical walls of the channels, so that the water flows down to the bottom of the channel.

In the accompanying drawing Fig. 1 is a vertical section on the line 1—1 of Fig. 2 of a portion of an apparatus arranged in accordance with this invention. Fig. 2 is a plan view, partially a horizontal section of the apparatus. Fig. 3 shows a detail.

The apparatus comprises a number of ring-shaped heating members 20, 20ª and 20ᵇ which are connected with one another by means of bolts 21, threaded into holes 22 in the lugs 23.

In the drawing the heating members have three concentric channels 3, 4 and 5 for steam, but the number of the channels may, evidently, be varied. The said channels are separated from one another by partitions 6 and 7 and their top wall consists of a thin, removable plate 11 of a material of great heat conducting capacity, for instance copper. As seen from the drawing the said plate has a slightly concavo-convex shape, i. e. it forms a part of a sphere with a long radius in order that it may be more adapted to sustain strainings due to expansion and that water of condensation, which possibly is deposited on the member, may run off more easily. The said shape is gained by the top edges of the intermediate walls 6 and 7 and of the outer wall being located on levels decreasing in height toward the periphery.

1 is the steam inlet. The steam passes from the said inlet through the passage 2 into the inner steam channel 3. From the channel 3 the steam passes at the end 8 of the intermediate wall 6 into the channel 4 and then at the end 9 of the intermediate wall 7 into the outer channel 5 and through the channel 5 and escapes through the outlet 10.

In the form of execution shown in the drawing each of the ring-shaped heating members is provided with a ring having a flange 14 which prevents the liquid from running off. Each ring has two inwardly extending projections 12 located diametrically opposite to one another. One of the said projections has a hole 13, which also extends through the member 17, through which the liquid runs down to the next ring-shaped heating member. The holes 13 are located in a zigzag order, so that in the heating member located below the heating member shown in Fig. 2, the hole is provided in the diametrically opposite projection 12, as shown by a dotted line in Fig. 2 and in full lines in Fig. 1. Fig. 3 illustrates the connection of the bottom walls by screw bolts 21.

The cross sectional area of the channels decreases proportionally to the condensation of the steam, in order that the velocity of the steam may be substantially constant in all channels in spite of the reducing of the volume resulting from the condensation. Thus, in the drawing the innermost channel 3, into which the steam is introduced, is the broadest one, for the reason that the condensation here is greatest. The width of the succeeding channels then successively decreases. The broadest channel may, however, be located at the periphery of the apparatus. In the drawing the width of the respective channels is, for constructional reasons, invariable along the whole channel. It would be more suitable, however, if each channel were successively reduced from the inlet end to the outlet end, but such arrangement would render the apparatus considerably more expensive and complicated. A satisfactory result is gained more cheaply by the shown arrangement of the channels.

If a specially effective running off of the water of condensation is desired small, flanges 15 extending downward from the plate 11 may be provided, at least in the broad channels, in order that the water particles need not travel such a long way before their striking an obstacle. This is suitable especially at low steam pressures, in which case it is of importance that the reduction of the steam pressure is as slight as possible. The bottom walls 17 ought to be slightly conical, so that the bottoms of the channels respectively successively slope from the channel, into which the steam is led in order that the running off of the water may be facilitated and that the changing of the shape effected by the heat may take place in a certain direction.

I claim:

1. An apparatus for vaporizing liquids comprising several superposed annular heating elements having annular flanges at their outer edges forming an enclosing wall, each element being provided with a plurality of shallow concentric substantially annular channels communicating with each other, a heat transmitting plate for each element covering the channels in that element and adapted to serve as a heating means between a heating vapor introduced into said channels and the liquid which rests on said plates, a conduit at the outer edges of said elements for introducing a heating fluid into said channels, and a second conduit at the outer edges of said elements for discharging said fluid from the channels, the cross section of the channels decreasing in size from the first mentioned conduit to the second conduit for the purpose of maintaining a practically uniform velocity for the heating medium in all the channels.

2. An apparatus for heat treating materials including superposed heating elements detachably connected together, each of said elements including an inner ring and an outer ring with an inclined floor extending from the inner ring to the outer ring, ribs on said floor forming communicating channels, heat transmitting plates arranged between the first mentioned heating plates and forming covers for said channels and floors to sustain the material to be treated, a conduit for introducing heating medium into said channels, and a second conduit for discharging the heating medium from the channels.

3. An apparatus for heat treating materials including superposed heating elements detachably connected together, each of said elements including an inner ring and an outer ring with an inclined annular floor extending from one ring to the other, vertical ribs on said floor forming communicating shallow channels, heat transmitting plates arranged between the heating elements and forming covers for said channels, a conduit for introducing a heating medium into said channels, a second conduit for discharging the heating medium from the channels, an annular flange member arranged on the inner ring of each heating element and provided with bulged portions, certain of said bulged portions together with the inner rings being apertured to permit the material undergoing treatment to flow downwardly from one of the heat transmitting plates to another heat transmitting plate arranged below.

4. An apparatus for heat treating materials including superposed heating elements, each consisting of an annular substantially concavo convex floor provided at its inner edge with an inner ring and provided at its outer edge with an upwardly extending flange and with a downwardly extending annular flange, the upwardly extending flange of each heating element being of less height than the inner ring of the element, substantially annular ribs projecting upwardly from each of said floors and forming substantially concentric shallow channels, means for introducing a heating medium into and discharging the heating medium from said channels, heat transmitting plates arranged between the elements and having their inner edge portions resting on the inner rings and their outer edge portions arranged between the flanges of the elements, and annular flanged members resting on said plates immediately in line with the inner rings and provided with means to permit the fluid being treated to flow off of one heating plate downwardly on to the heating plate below.

In testimony whereof I have affixed my signature.

KARL LARS ESAIAS THUNHOLM.